UNITED STATES PATENT OFFICE.

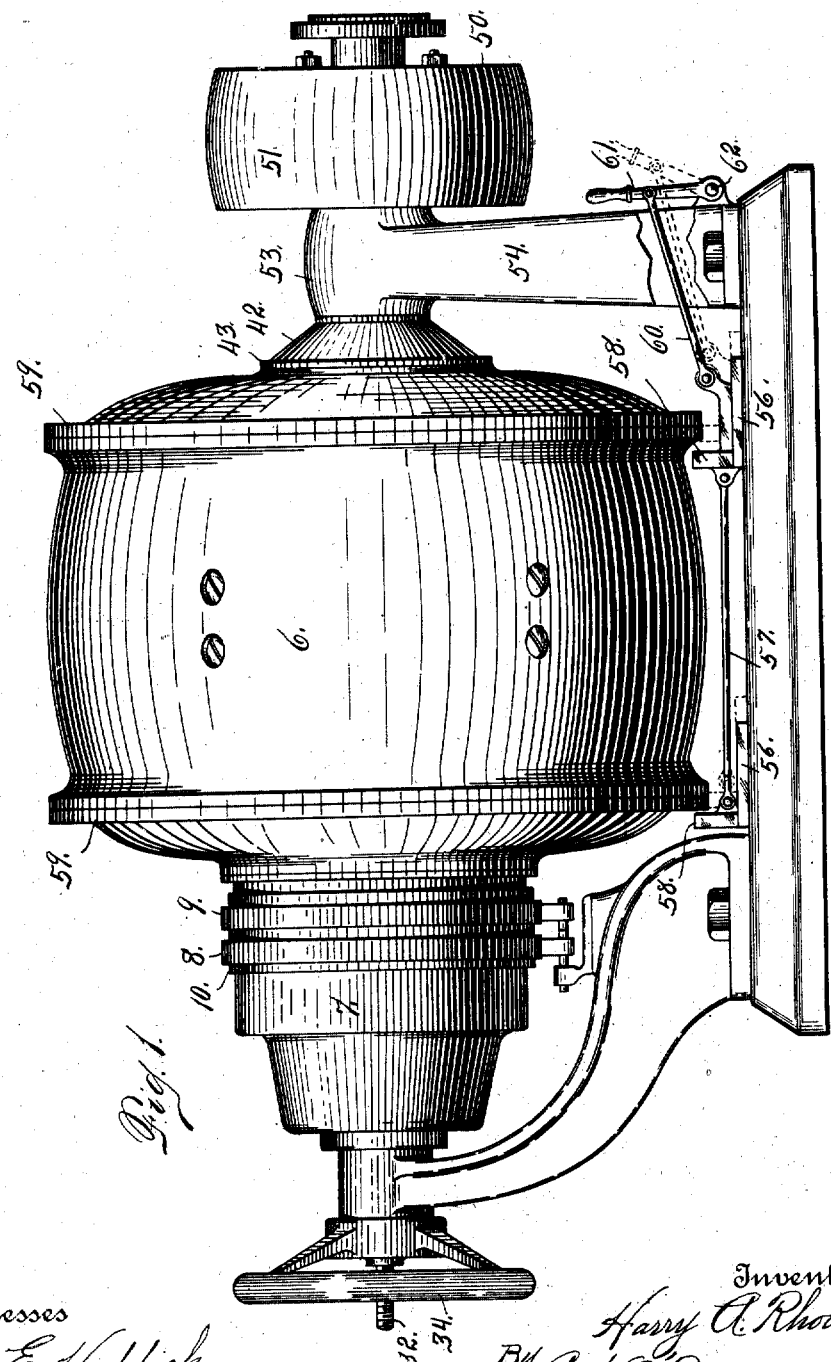

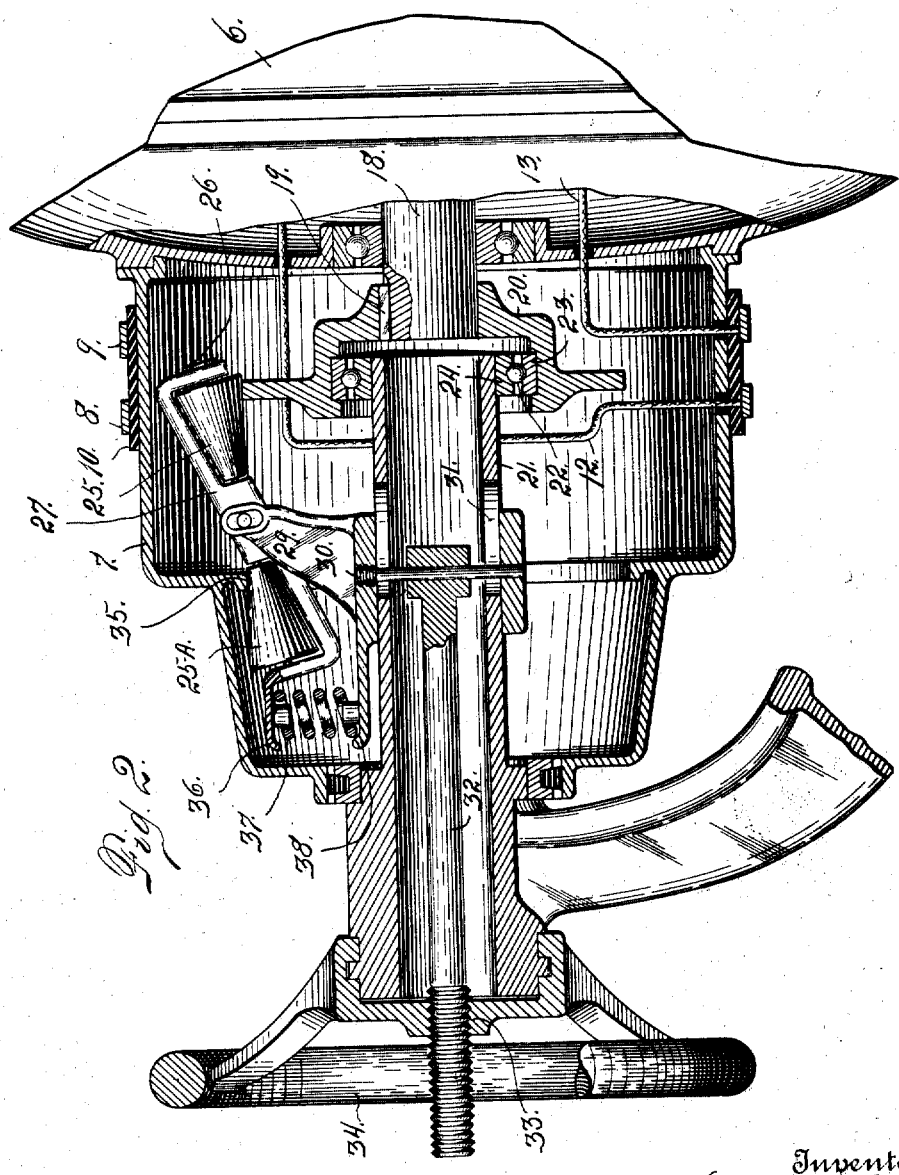

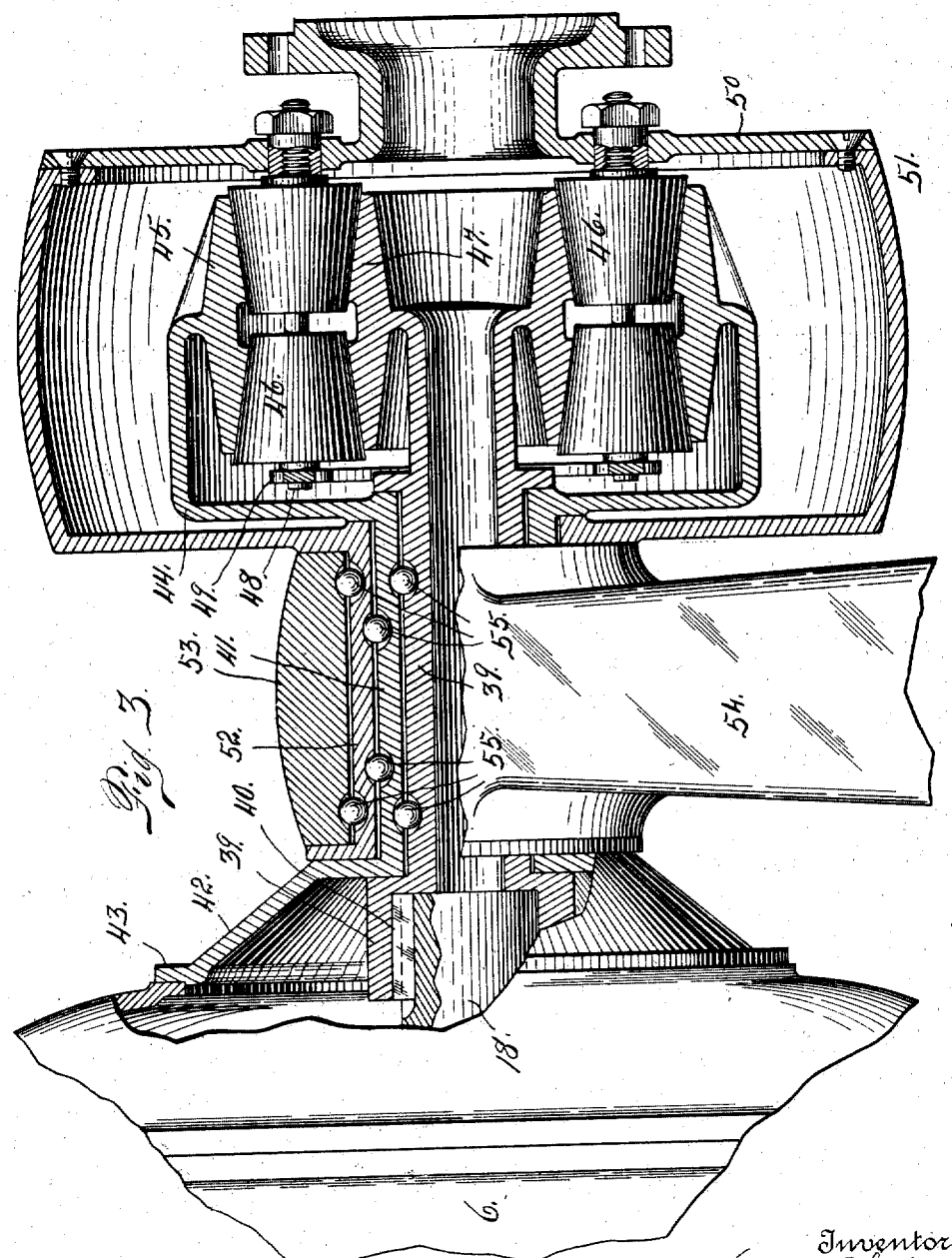

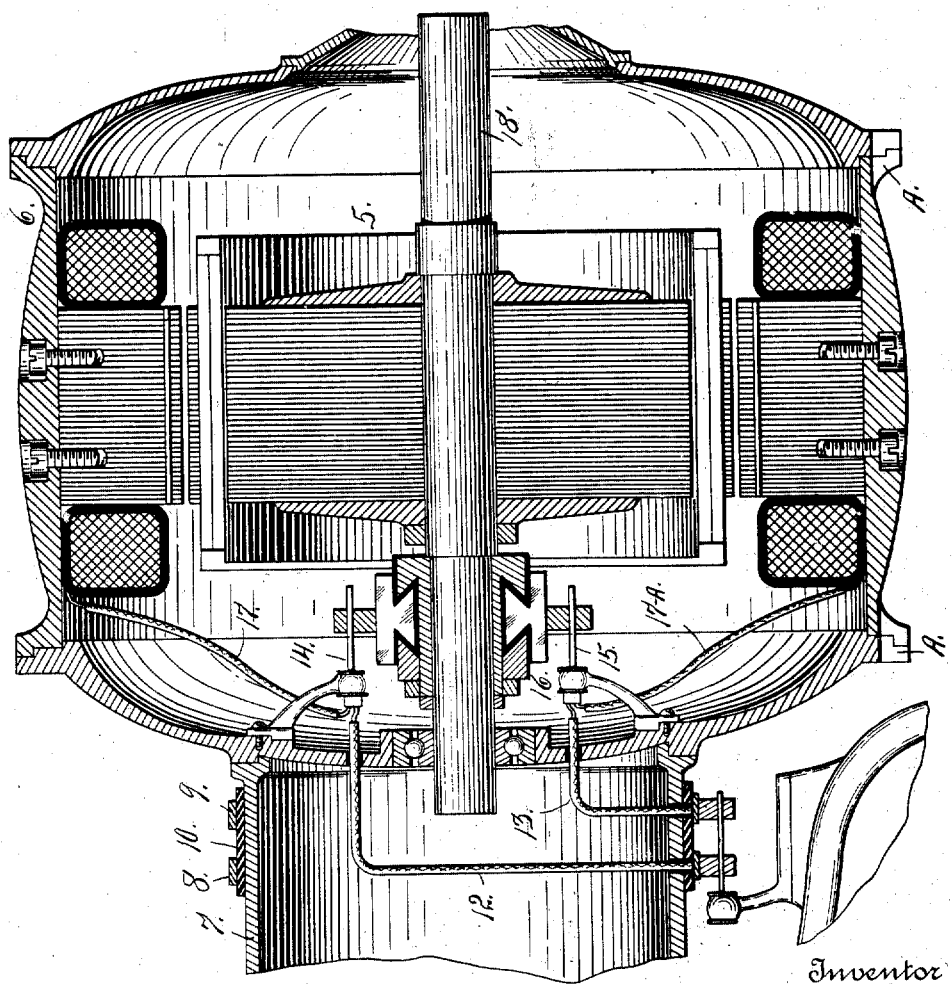

HARRY A. RHODES, OF DENVER, COLORADO, ASSIGNOR TO THE UNIVERSAL MOTOR COMPANY, OF DENVER, COLORADO, A CORPORATION OF ARIZONA TERRITORY.

TRANSMISSION-GEARING.

994,537. Specification of Letters Patent. Patented June 6, 1911.

Original application filed July 20, 1909, Serial No. 508,654. Divided and this application filed October 18, 1909. Serial No. 523,279.

*To all whom it may concern:*

Be it known that I, HARRY A. RHODES, a citizen of the United States, residing in the city and county of Denver and State of Colorado, have invented certain new and useful Improvements in Transmission-Gearing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in transmission gearing, adapted for use with motors generally, but more especially applicable for use with electric motors, a division of my co-pending application for patent on an electric motor, Serial No. 508,654, filed July 20, 1909.

Most electric motors run at high speed, thus reducing the construction weight and allowing a high efficiency. For practical use however, the motor speed must be geared down to a considerable extent. The means employed to accomplish this speed reduction heretofore, so far as I am aware, have been very complicated, in order to reduce the loss of power to a minimum. In other cases the speed reduction has been attained by disregarding the loss of efficiency in the motor. The construction employed in the first case, however, has proved unsatisfactory for practical use, on account of the many complications connected therewith, which endanger the working of the power producer, and the second form of construction is at present generally used wherever speed regulation is necessary. It is well known that by using such means as to decrease the efficiency of the motor, the resulting loss of power is very high. It is obvious therefore, that the price per H. P. in such cases is quite out of proportion to the work accomplished.

The object of my present invention is to provide means for regulating and reversing the movement of any motor without losing much power in gearing, and still retain the same efficiency of the motor all the time. This is accomplished by causing both members of the motor to rotate in opposite directions and introducing a third member, to which the reduced speed or differential is communicated, the third member being connected to do work of any desired character. The regulation of speed is accomplished by varying the relative speed of the two motor members, as each rotating member has a certain kinetic energy, I provide means to transfer this energy from the member. If I desire to slow down in speed to the other member, it is obvious that the last named member, if given an opportunity to increase its speed, will take on that part of the kinetic energy which is available from the member whose speed is reduced. There are several forms of construction which may be utilized in carrying out this principle. In my present construction there are always two distinct members of either opposing or attracting nature. If we assume that one member is held fast, then the other member must in accordance with its opposing or attracting tendency, begin to revolve, until it reaches its maximum speed. By letting the other member rotate also, we distribute this speed maximum between the two members, that is, in accordance with their kinetic energy.

If we assume that two members are rotating around the same center, and balls, rollers or gears are interposed between them and mounted on a third member, as long as the individual peripheral speeds of the two first named members are equal, these balls, rollers or gears will of course rotate around their own center or individual axes, but will not cause the part upon which they are mounted to travel from a given location. The least difference in peripheral speed of the two members however, must result in imparting travel to the third member, upon which the rollers or gears are mounted, the said travel being proportional to the differential or difference in speed between the two rotating motor members. It follows that the greater the difference in speed between the two motor members the faster the third member will rotate, until it reaches its maximum speed, when one of the two motor members reaches zero speed.

By applying a speed reducing or regulating device to the two motor members, it will be understood that the speed of the two members may be so regulated that when either member is at zero speed, the other member will be at its maximum speed, thus resulting in imparting the maximum speed to the third member, in one direction, or the other as may be desired.

By changing the relative speed of the two motor members it is obvious there is no such loss of efficiency as there is whenever the speed regulation is accomplished through means which decrease the efficiency of the motor to approximately the same extent as the speed is reduced. As an example of the last named method of speed regulation, I will call attention to the introduction of resistance into the motor circuit. It is also obvious that the speed regulation employed in my improved construction acts smoothly and without any shock whatever to the mechanism. Another feature is the reversibility of my improved construction, whereby the third member may be caused to change its direction of movement without any loss of kinetic energy in the motor, thus protecting the latter to a great extent. Furthermore the kinetic energy of the motor itself will have a tendency to follow the regulation in the quickest possible time, as my regulating mechanism is based on the principle of transferring kinetic energy from one rotating body to another.

From what has been stated, it will be understood that by virtue of my improved construction, the speed imparted to the device to be operated by the motor, may be as slow as desired, regardless of the speed of the two motor members, since no matter how fast the two members are rotating, by means of my improved speed regulator, any desired differential between the speeds of the two members may be maintained, thus giving the same result so far as speed is concerned, as the interposition of speed reducing gears between the motor and the device to be operated thereby, but at the same time avoiding the frictional loss of power due to the use of such gearing. If we assume that the two motor members are traveling at the same peripheral speed, and a roller be interposed between them, the two motor members rotating in opposite directions, it is evident that the action of the one member upon the roller will exactly neutralize the action of the other member upon the roller, whereby the latter is prevented from orbital travel, though of course rotating upon its individual axis. In order that this may be true, it must be understood that there is a distinction between peripheral travel and travel measured in revolutions,—for instance, if the peripheral face of the one member of the motor which engages the roller, is of greater circumference than the corresponding face of the other motor member, it will be understood that the member having the smaller circumference must travel more than a single revolution in order to keep up with and neutralize the action of the member having the larger peripheral face. By way of illustration we may assume that the circumference of the larger member is 30 inches, while the circumference of the smaller member is 20 inches. Now it will be understood that in order for the action of the smaller member to neutralize the action of the larger member to prevent the orbital travel of an interposed roller, the smaller member must make 1½ revolutions while the larger member is making a single revolution.
Hence whenever the term "equal speed" is employed in this specification, peripheral speed will be understood as distinguished from speed measured in revolutions.

Having briefly outlined my improved construction of motor, as well as the principle upon which it operates, I will proceed to describe the same in detail, reference being made to the accompanying drawing, in which is illustrated an embodiment thereof.
In this drawing: Figure 1 is an elevation of a motor equipped with my improvements. Fig. 2 is an enlarged fragmentary section of the left hand side of the same. Fig. 3 is a similar section of the right hand side of the construction shown in Fig. 1. Fig. 4 is a central vertical section of the central part of said construction, the parts being shown on a larger scale.

The same reference characters indicate the same parts in all the views.

Let the numeral 5 designate the armature member of the motor, and 6 the field member thereof. It must be understood however that these terms are applied to these members for convenience only, and in order to distinguish the one member from the other. It may also be stated that in order to carry out the principle of my improved construction, it is not necessary that the two motor members moving in opposite directions shall necessarily maintain such a relation to each other that one may always be properly termed the "field" and the other the "armature." It may be stated that so far as the general construction of the motor which I employ is concerned, it may be of any ordinary manufacture except that the two members, for convenience designated the armature member and the field member, must both be permitted to revolve, and the polarity of the current supplied to them must be so regulated that the two members will rotate in opposite directions. The relative speed of the two members will, of course, be determined by their relative mass. One extremity, 7, of the casing or field member of the motor, is supplied with rings 8 and 9, which are separated from the part 7 by insulating material 10. The current from the generator (not shown) is supplied to these rings and conductors 12 and 13, mounted in the motor, lead from the rings 8 and 9 respectively, to the brushes 14 and 15, which engage the commutator 16, through which the armature member 5 is supplied with current. The coils of the field member are also supplied with current through the conductors 17 and 17ᴬ, which are electrically connected with the conductors 12 and 13, see Fig. 4.

One extremity of the armature shaft 18, is keyed, as shown at 19 to the hub of a wheel 20, journaled upon a stationary sleeve 21, by means of ball bearings 22, interposed between steel rings 23 and 24 mounted upon the wheel and sleeve respectively. The periphery of the wheel 20, engages a cone-shaped member 25, fast upon a spindle 26, journaled in a holder 27, the latter being trunnioned upon a bracket 29, connected with the stationary sleeve 21 of the motor, by means of a screw pin 30, passing through a slot 31, formed in the said sleeve. This pin 30 is connected with a rod 32, threaded in a cap 33, journaled on the outer extremity of the sleeve 21, and formed integral with an operating wheel 34. As the rod 32 is prevented from rotating the rod may be caused to travel longitudinally within the sleeve 21, by rotating the wheel 24 and the cap 33, thus changing the relative position of the bracket 29, upon which the holder 27 is mounted. This holder 27 also carries a second cone-shaped member 25ᴬ, mounted and made fast upon the spindle 26, the latter being journaled in the frame or holder 27, as just explained.

As shown in the drawing, the two cones 25 and 25ᴬ, have their smaller extremities toward the center. As just explained, the periphery of the wheel 20, engages cone 25 while the field-casing member 7 has an inwardly extending flange 35, engaging the cone member 25ᴬ. In order that the two cone members may be held in proper operative contact with the parts 20 and 35, the holder 27 is provided at one end with an extension 36, which engages one extremity of a coil spring 37, whose opposite extremity engages an extension 38 of the bracket 29.

It will now be understood that the wheel 20, engaging one of the cones, is connected to rotate with the armature member of the motor, while the flange 35, engaging the other cone, is mounted upon and rotates with the field member of the motor. I will also state that the trunnioned device carrying the two cones 25 and 25ᴬ, is a speed regulating device, whereby any desired speed differential between the two members of the motor, that is to say the field and armature members, may be maintained. As illustrated in the drawing, the circumferences of the wheel 20 and that of the flange 35, where it engages the cone 25ᴬ, are equal. Now if we assume that the two members of the motor are traveling at equal speed in opposite directions, it will be understood that the speed of either member may be reduced, and that of the other member accelerated by the adjustment of the speed regulating device. For instance if this device is so adjusted that the periphery of the wheel 20 and the engaging part of the flange 35, both engage the cones 25 and 25ᴬ, at the center or where the said cones are of equal circumference, the speed of the two members will remain the same in relation to each other, and the speed regulating device will have no effect. If, however, the speed regulating device be shifted toward the left, see Fig. 2, by turning the wheel 34 and the cap 33, so that the flange 35 shall engage the smaller extremity of its cone and the periphery of the wheel 20 shall engage the larger extremity of its cone, the speed of the field member of the motor will be retarded and that of the armature member of the motor correspondingly accelerated. Furthermore if we assume that the circumference of the cone 25, where it engages the wheel 20 is three times that of the circumference of the cone 25ᴬ, where the latter engages the flange 35, the result will be that the armature member of the motor is traveling three times as fast as the field member of the motor.

The extremity of the armature shaft remote from its connection with the wheel 20, is keyed to a sleeve 39, as shown at 40, thus connecting the armature member of the motor with this sleeve. A sleeve 41 is also connected at one extremity with the field member of the motor, by means of a cone-shaped casing member 42, which is made fast to one end of the casing or field of the motor, as shown at 43. The opposite extremity of the sleeve 41, is connected by means of a bracket 44, with a bearing ring 45, which engages a series of cone-shaped rollers 46, interposed between the ring 45 whose inner circumference is tapered outwardly in opposite directions and an opposing ring 47 of counterpart shape, formed upon the outer extremity of the sleeve 39, connected with the armature member as heretofore explained.

All of the rollers 46 of the series are mounted on spindles 48. The inner extremities of the spindles 48 engage a ring 49, while their outer extremities are connected with the detachable head 50, of a wheel or pulley 51, from which the speed differential may be transmitted to the device or machine to be operated. In the foregoing description it has been assumed that the speed regulating device has been so adjusted that the two motor members are traveling at different speeds in the proportion of one to three, that is to say we have assumed that the armature member is traveling three times as fast as the field member, and in this case the speeds may be considered either in terms of revolutions or in terms of peripheral travel, since the parts engaging the speed regulating cones are of the same circumference.

Attention is now called to the fact that the bearing ring 47, engaging the rollers 46, is of less circumference than the bearing ring 45, engaging the same rollers. Now if the armature member with which the ring 47 is connected, travels three times as fast in revolutions, as the field member with which the ring 45 travels, the peripheral speed of the two rings 45 and 47 will have a still smaller differential, and it is evident that in order for the speed of the ring 45 traveling in one direction to neutralize the speed of the ring 47, traveling in the opposite direction, so that there would be no orbital travel of the rollers 46, it would be necessary for the ring 47 to make less than one revolution, while the ring 45 was making a single complete revolution. In any event however, the relative rapid travel of the ring 47 in one direction, is neutralized to the extent of the travel of the ring 45 in the opposite direction, and if we should assume that the peripheral travel of the two rings is in the proportion of two to one, the differential speed imparted to the pulley 51, would be one half of the speed of the ring 47. From this it is evident that by adjusting the regulating device, any desired differential may be delivered to the pulley or wheel 51 and transmitted to any device to be operated. It is evident that the pulley or wheel 51, might be a vehicle wheel if desired, or a pulley with which a belt may be connected for transmitting motion to any machine or device to be operated. The wheel 51 is provided with a hollow journal or sleeve 52 interposed between the sleeve 41 and a stationary bearing 53, mounted upon a pedestal 54, of the frame work. In order to reduce the friction between the bearing 53, the pulley sleeve 52, and the sleeves 39 and 41, ball bearings 55, are employed.

It will be understood from what has already been stated, that in order to reverse the travel of the member 51, to which is transmitted the speed differential between the two motor members, it will only be necessary to reverse the position of the speed regulator, that is to say referring to Fig. 2, by shifting the latter toward the right, which may be accomplished by turning the hand wheel 34, whereby the periphery of the wheel 20 will act upon the smaller extremity of its cone 25, while the flange 35 will act upon the larger extremity of its cone member 25$^A$. In this case the field member of the motor will have the greater speed, and the bearing ring 45, with which the last named member is connected will determine the direction of orbital travel of the rollers 46, and the pulley or wheel member 51. It is evident that in this case the direction of travel of the member 51 will be the reverse of its travel, when the speed regulating device is in the position shown in Fig. 2. It will thus be seen that the speed of the member 51, which is determined by the speed differential between the two motor members may be determined with perfect accuracy since by the proper adjustment of the regulating device the speed differential between the two motor members may be regulated as desired, and in favor of either member, the member having the greater travel determining the direction of the rotation of the third member 51.

In case it is desired to lock the field member of the motor against rotation, whereby the speed differential shall be the entire speed of the armature member, thus giving the third member the maximum possible speed, any suitable means may be employed. In Fig. 1 of the drawing, I have illustrated a suitable construction to accomplish this purpose, the same consisting of two blocks 56, connected by a rod 57, each block having an upward projection 58, adapted to engage a recess A employed in the rims 59 forming the exterior rims of the field member. One of these plugs is connected by means of a rod 60, with a hand lever 61, fulcrumed at 62. When this lever is thrown to the dotted line position in Fig. 1, the locking device is thrown to a corresponding position, whereby the projections 58 engage the recesses of the rims of the field of the motor and lock the latter and its attachments against rotation.

The mechanism, whereby the speed differential of two electric motor members, rotating in opposite directions, may be transmitted to a third member, to give the latter any desired slow speed, regardless of the velocity of the rotating members of the motor, may be advantageously utilized by reversing the operation of the same, when it is desired to change the electric motor into a dynamo or generator. In this case, it will only be necessary to connect a slow speed engine with the third member, of the said differential speed mechanism; in which event the operation of the motor parts will, of course, be given the same velocity in opposite directions, that could be initially imparted when the device is used as a motor, in order to produce a corresponding differential slow speed in the third member. This construction will, therefore, overcome a difficulty heretofore experienced, viz: that it has been found impossible to employ certain slow speed engines for generating electricity, since the maximum speed at which it is practicable to run these engines, is not sufficient for electrical generating purposes on a commercial scale.

Having thus described my invention, what I claim is:

1. The combination of two members, rotatable in opposite directions and at varying speeds, and a third member composed of two cones acted on by parts of both of the first named members, whereby the travel of the third member is proportional to the difference between the speeds of the first named members.

2. The combination of two members mounted and connected to rotate in opposite directions, means for varying the speed of the said members and two cone shaped members movably mounted to receive the differential speed from said members.

3. The combination of two members mounted and connected to rotate in opposite directions, means for varying the speed of the two members comprising a bracket adjustably mounted, and a spindle equipped with cone members mounted to rotate therewith and constructed to accomplish the aforesaid function.

4. The combination of two members mounted to rotate in opposite directions and a speed regulating device adjustably mounted and composed of a spindle and two cone-shaped members fast thereon, and arranged in reverse order to engage parts of the said members.

5. The combination of two members mounted to rotate, in opposite directions, two cone-shaped members arranged in reverse order to engage the parts of said members for regulating the relative speed of the two members to produce any desired differential speed in favor of either member, a third member interposed between the parts of the first named members, the third member being free to rotate on its individual axis and to travel in a predetermined orbit, the arrangement being such that the first named members coöperate to impart rotation to the third member on its individual axis while they act in opposition to each other in imparting orbital travel.

In testimony whereof I affix my signature in presence of two witnesses.

HARRY A. RHODES.

Witnesses:
JESSIE HOBART,
A. EBERT O'BRIEN.